(No Model.)
N. E. SHAILER.
LOCK NUT.
No. 292,063. Patented Jan. 15, 1884.
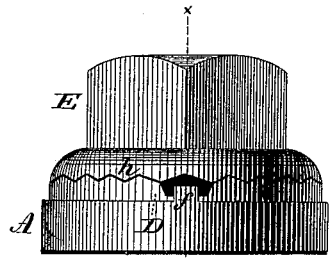
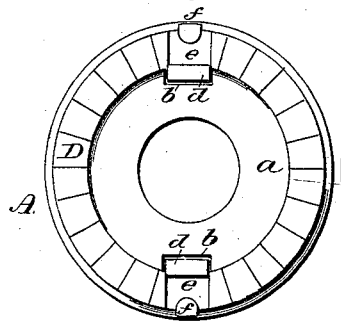
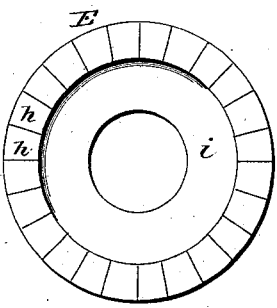
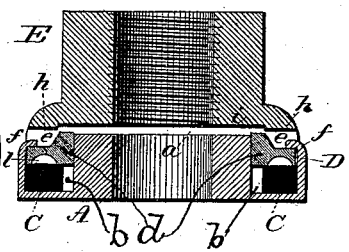
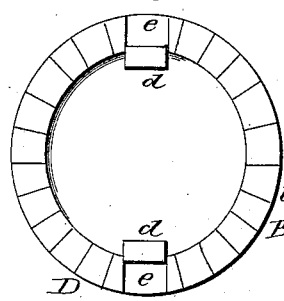
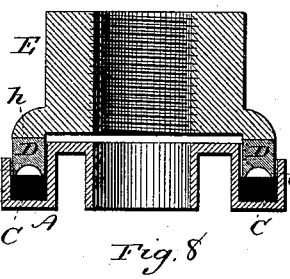
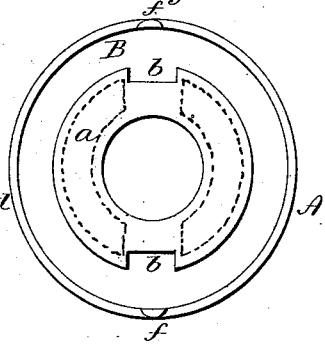
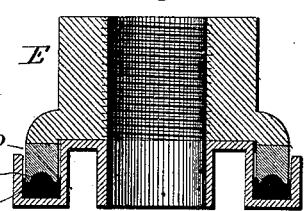
Witnesses.
Nathan E. Shailer
Inventor
By Atty

UNITED STATES PATENT OFFICE.

NATHEN E. SHAILER, OF PULLMAN, ILLINOIS, ASSIGNOR OF TWO-THIRDS TO SIMEON W. SHAILER AND W. W. SHAILER, BOTH OF IVORYTON, CONNECTICUT.

LOCK-NUT.

SPECIFICATION forming part of Letters Patent No. 292,063, dated January 15, 1884.

Application filed November 26, 1883. (No model.)

*To all whom it may concern:*

Be it known that I, NATHEN E. SHAILER, of Pullman, in the county of Cook and State of Illinois, have invented a new Improvement in Lock-Nuts; and I do hereby declare the following, when taken in connection with accompanying drawings and the letters of reference marked thereon, to be a full, clear, and exact description of the same, and which said drawings constitute part of this specification, and represent, in—

Figure 1, a side view of the nut and washer complete; Fig. 2, a vertical central section on line *x x*; Fig. 3, a top view of the washer with the nut removed; Fig. 4, an under side view of the nut, looking up; Fig. 5, a top view of the locking-ring; Fig. 6, a vertical transverse section cutting at right angles to the section of Fig. 2; Fig. 7, a top view of the washer with the ring and spring removed; Fig. 8, a vertical section, same as Fig. 6, but showing the nut seated upon the washer.

This invention relates to an improvement in that class of nuts which are provided with a device for locking them when turned upon their bolts to the proper holding position, and so as to prevent the return of the nut, and particularly to that class which have a latch-like fastening to act upon the under face of the nut, the object of the invention being to bring the nut to a solid bearing independent of the yielding or locking device; and the invention consists in the construction of the nut and locking device as hereinafter described, and more particularly recited in the claims.

A represents the washer, which surrounds the bolt in the usual manner of metallic washers, and upon which the nut is to bear. Upon the upper face of the washer is a concentric channel, B, into which an india-rubber or other suitable elastic material ring or spring is placed, and upon this spring, and into this channel upon the spring, I place a metal ring, D, the depth of this metal ring and spring C combined being greater than the depth of the channel below the upper face, *a*, of the washer. From the channel one or more notches, *b*, are made into the body of the washer, and from the ring corresponding projections, *d*, are formed, which will enter the corresponding notches, *b*, as seen in Fig. 3, and prevent the ring being rotated independent of the washer. At one or more points in the upper surface of the ring D recesses *e* are formed from the outside inward, and on the outer wall of the washer corresponding tongues or projections, *f*, are made, which, when the ring is set in place upon its spring, are turned inward, as seen in Fig. 2. These prevent the escape of the ring or spring from the washer. The upper surface of the ring is serrated radially, as seen in Fig. 1.

E is the nut, its under surface constructed flat, except near its outer edge, as at *h*, that outer edge being serrated corresponding to the serrations in the ring, and as seen in Figs. 1 and 4. When the nut is set upon the ring, its under surface, *i*, will stand above the corresponding bearing-surface, *a*, on the washer, as seen in Fig. 2. The washer is placed over the bolt in the usual manner of applying a washer, then the nut set thereon and turned down. The spring yields to permit the serrations on the nut to escape the serrations on the ring D until the nut shall come to a solid bearing upon the washer, as seen in Fig. 8, the spring being gradually compressed as the nut approaches the washer; but the elasticity of the spring is not exhausted until the nut shall have come to this firm and solid bearing upon the washer. When the nut is thus seated, the serrations in the ring serve to hold and lock the nut in that position. By this construction the locking device permits the nut to come into as firm and solid a bearing upon its washer as it would do were there no locking device present, and because of the eccentricity of the locking device the nut may be turned to any extent greater than a single serration, either to increase or reduce its pressure.

In nuts of this class as heretofore constructed the bearing-surface of the nut has been upon the serrated ring; hence, as the spring must be compressed sufficiently to let the serrations of the nut pass the serrations on the ring, there would always be a letting back equal to the depth of the serrations after the final turning of the nut, and there must also be a yielding pressure or strain upon the nut; but by bringing the nut directly onto the washer, and independent of the locking device, I attain as firm and solid a bearing for the nut as if there were no locking device present.

In order to make room for the compression of the spring, I recess the under face of the ring, as seen at $l$, so that the entire surface of the ring does not at first bear upon the surface of the spring. This recess leaves a space into which the spring may pass as it is compressed within its chamber.

Instead of making the projections $d$ on the ring and the notches $b$ in the washer, it will be understood that this order may be reversed, it being immaterial how the interlocking is made, it only being essential that there shall be such a projection or irregularity upon the one to enter corresponding projections or irregularities in the other as to prevent the ring from rotating on the washer.

It will be observed that the line on which the section Fig. 2 is made cuts through the lugs on the ring D, which enter corresponding notches in the washer, whereas the sections Figs. 6 and 8 cut at right angles to the section of Fig. 2; hence it is that the ring appears to be broader in Fig. 2 than in Fig. 6. At the point where the notches are formed in the washer the washer is cast solid; but at the other points it is recessed on the under side, as seen in Figs. 6 and 8. The notches in the washer in which the lugs stand extend to the bottom of the recess in which the elastic material is placed; hence at that point there appears to be a small space between the elastic material and the inner wall of the washer.

The recess in the under side of the washer, Figs. 6 and 8, is made to reduce the weight of metal.

From the foregoing it will be understood that I am aware that nuts have been constructed with radial serrations upon their under face, and with a corresponding radial yielding ring beneath, and therefore do not claim, broadly, such construction; but What I do claim as my invention is—

1. The combination of the washer A, constructed with its central bearing-surface, $a$, the concentric channel B, spring C in said channel, and ring D in said channel and upon the spring, and having its upper surface radially serrated, with the nut E, having its under face, $i$, constructed to bear upon the surface $a$ of the washer, and its surrounding surface serrated corresponding to the serrations in the ring, and so as to work therein, substantially as described.

2. The combination of the washer A, constructed with a bearing-surface, $a$, for the nut, and with a concentric channel, B, the spring C in said channel, and serrated ring D upon said spring, said ring and washer constructed the one with a projection, $d$, and the other with a corresponding notch, $b$, whereby said ring is engaged with said washer, and the nut E, constructed with its bearing-surface $i$ corresponding to the surface $a$ of the washer, and with a serrated surface surrounding said bearing-surface corresponding to the serrated surface of the ring, substantially as described.

3. The combination of the washer A, constructed with a bearing-surface, $a$, for the nut, and with a concentric channel, B, the spring C in said channel, and serrated ring D upon said spring, the said ring constructed with one or more recesses upon its face, and the washer with corresponding tongues, $f$, substantially as and for the purpose described.

NATHEN E. SHAILER.

Witnesses:
HORACE M. PENN,
L. P. DESPLAINES.